June 4, 1935.  E. PICK  2,003,757
CONTINUOUS AUTOMATIC WATER SOFTENING
Filed Jan. 3, 1931  3 Sheets-Sheet 1

Inventor
Eric Pick,
By W. P. McElroy
Attorney

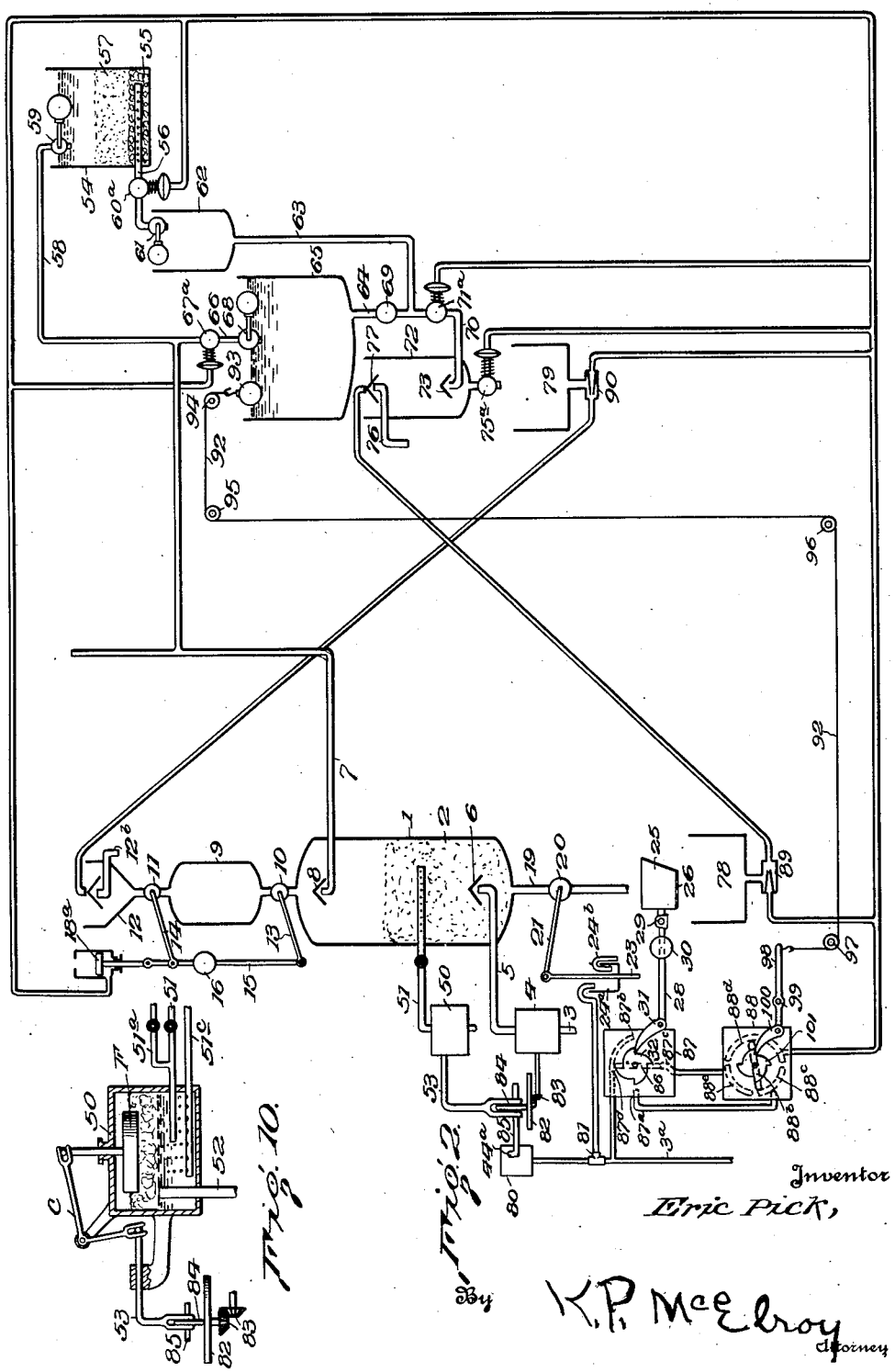

June 4, 1935.   E. PICK   2,003,757
CONTINUOUS AUTOMATIC WATER SOFTENING
Filed Jan. 3, 1931   3 Sheets-Sheet 3
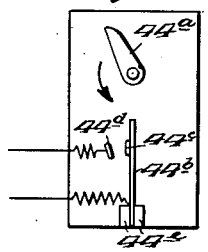
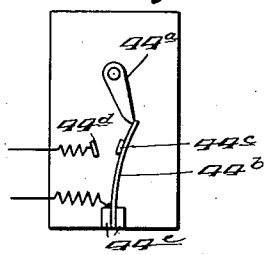
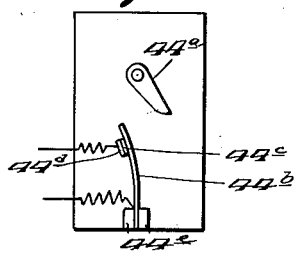
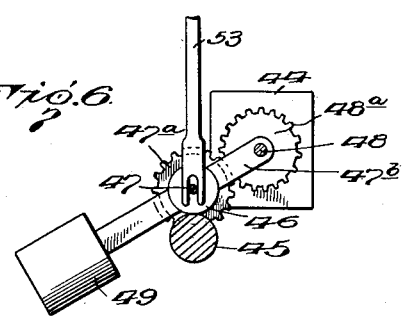
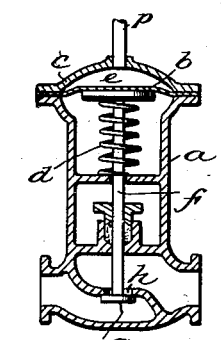
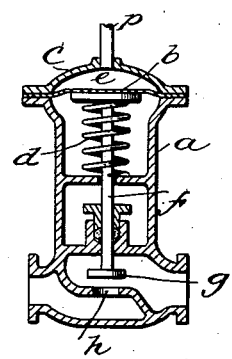
Inventor
Eric Pick,
By K. P. McElroy
Attorney Patented June 4, 1935

2,003,757

UNITED STATES PATENT OFFICE 2,003,757

CONTINUOUS AUTOMATIC WATER SOFTENING

Eric Pick, New York, N. Y., assignor to The Permutit Company, (1934), Wilmington, Del., a corporation of Delaware Application January 3, 1931, Serial No. 506,473

15 Claims. (Cl. 210—24)

This invention relates to continuous automatic water softening and it comprises a water-softening apparatus having a zeolite-containing chamber for softening water and a separate chamber for regenerating and washing zeolite with means for periodically moving definite portions of the zeolite from the softening chamber to the regenerating chamber, means for passing regenerating and washing liquids through the zeolite portions in the regenerating chamber and means for returning the regenerated portions to the softening chamber, the zeolite moving, regenerating and returning means being automatically started by means connected with the flow of water being softened, said automatic starting means being adjustable to the degree of hardness of the water being softened; and it further comprises a method of continuous base exchange water softening wherein the base exchange material is circulated through a softening phase and a regenerating phase and the quantity of zeolite circulated and regenerated is controlled by the amount of softening performed; all as more fully hereinafter set forth and as claimed.

In softening water by base exchange zeolites it has heretofore been proposed to avoid interruption of softening for regeneration of the zeolite by either continuously or intermittently transferring the zeolite from a softening zone for regeneration elsewhere and retransferring regenerated zeolite to the softening zone. These proposals have failed to provide means for coordinating the transfer of zeolite and its regeneration with the amount of softening done. They have not provided regulation of zeolite transfer and revivification responding to variations in the rate of zeolite exhaustion.

In the present invention I provide in means for removing, regenerating and replacing the zeolite a means of controlling these operations which responds automatically to the amount of softening performed, that is, to the product of the quantity of water softened multiplied by the degree of hardness removed. The regeneration of the zeolite corresponds to its exhaustion. In the movement of zeolite responsive to its softening function I may use means actuated by the kinetic energy of flowing water or I may move zeolite by mechanical or electrically driven means from a softening chamber to a regenerating chamber, thence, if desired, to a washing chamber and from this back to the softening chamber. So doing, I maintain a body of zeolites in the softening chamber and I may move zeolites more or less continuously. I find it however advantageous to transfer definite portions of the zeolite body from time to time for regeneration and cleansing and to replace each removed portion with another portion of freshly regenerated zeolite. Movement of the zeolite through the several chambers is advantageously by a gravital fall through rising counterflows of the water being softened, regenerating brine and washing water, respectively. The chambers are provided at the bottoms with valved outlets through which to withdraw zeolite from the chambers and associated with the valved outlets means may be provided for adjusting the quantity of zeolite in each portion transferred from the softening chamber for regeneration and cleansing.

In the responsive control of the periodic transfer of portions of the zeolite body with regeneration, washing and return to the softening phase, I provide means for regulating the intervals of time between the portional transfers. The time intervals between zeolite transfers are conveniently set by a water meter in the raw water supply line or in the soft water service line, said meter being adapted to close an electric circuit after a predetermined quantity of water has passed through the meter, the closing of the circuit acting to start a motor operating means for moving zeolites and also acting to energize solenoid spring valves controlling the system. The operation of the meter to close the circuit at proper times may be modified to meet changes in the hardness of the water being softened so that the duration of the time intervals between portional transfers for regeneration may be in inverse proportion with the rate of exhaustion of the zeolite. The electrical circuit may be broken at the end of each zeolite movement by means of a switch in the circuit with a mechanical connection to the motor shaft adapted to open the switch after a predetermined time and thus to stop the motor and to return the solenoid valves to their normal or inoperative positions. With automatic timing of the intervals between the portional zeolite transfers and regenerations I provide means for controlling the quantity of brine used in regenerating the zeolite portions and thus make regeneration of the zeolite correspond accurately to its exhaustion even when the rate of water softening varies within wide limits from time to time. So doing, I preserve the advantage of continuous uninterrupted water softening service and gain the new advantages of simplicity and economy attendant upon automatic, coordinated operation. The frequency of portional regeneration can be controlled by any suitable method or means. For example, the circuit controlling the valves and the motor operating the zeolite transfer mechanism may be switched on by a contact device responsive to a small degree of hardness in water samples taken from below the top of the zeolite body or bed in the water softening chamber. A means adaptable to present purposes is provided in a recent method of control in which closing of an electric circuit is effected by a change in the ratio of the electrical conductivities of the raw water and the softened water incident to a slight hardening of the softened water.

A feature of the present invention is the method and means for introducing fresh zeolite into a softening chamber which is operated under the pressure of the usual water supply mains, this pressure being communicated to the soft water service line running from the softener. The softening chamber is provided at its top with an auxiliary chamber or compartment communicating with the softening chamber through a suitable valve or gate, the auxiliary compartment having a gated inlet at a point removed from the main chamber. A portional batch of regenerated zeolite is conveyed with or without water through the inlet gate into the compartment while the communicating gate is closed. Upon closing the inlet gate and opening the communicating gate, the zeolite falls by gravity into the softening chamber, leaving clear water in the compartment. The action is analogous to that of a lock. When the lock is used in conjunction with automatic transfer of zeolite in portions the opening and closing of the gates is coordinated with the zeolite transfer as hereinafter described.

Instead of effecting the transfer of the zeolite and the operation of the valves by electrical means these functions can, if desired, be performed by hydraulic or pneumatic means.

In the accompanying drawings I have illustrated diagrammatically combinations of apparatus elements within my invention and adapted to carry on the described method. In this illustration:

Figs. 3, 4 and 5 are detail sketches of the momentary switch (44) of Fig. 1;

Fig. 6 is a detail vertical section along the line X—X of Fig. 1;

Figs. 7 and 8 are details in vertical section of hydraulically operated valve construction;

Fig. 9 is a detail of the momentary valve operating mechanism (80) of Fig. 2.

Fig. 10 illustrates a modified means of control.

Figures 1, 2:
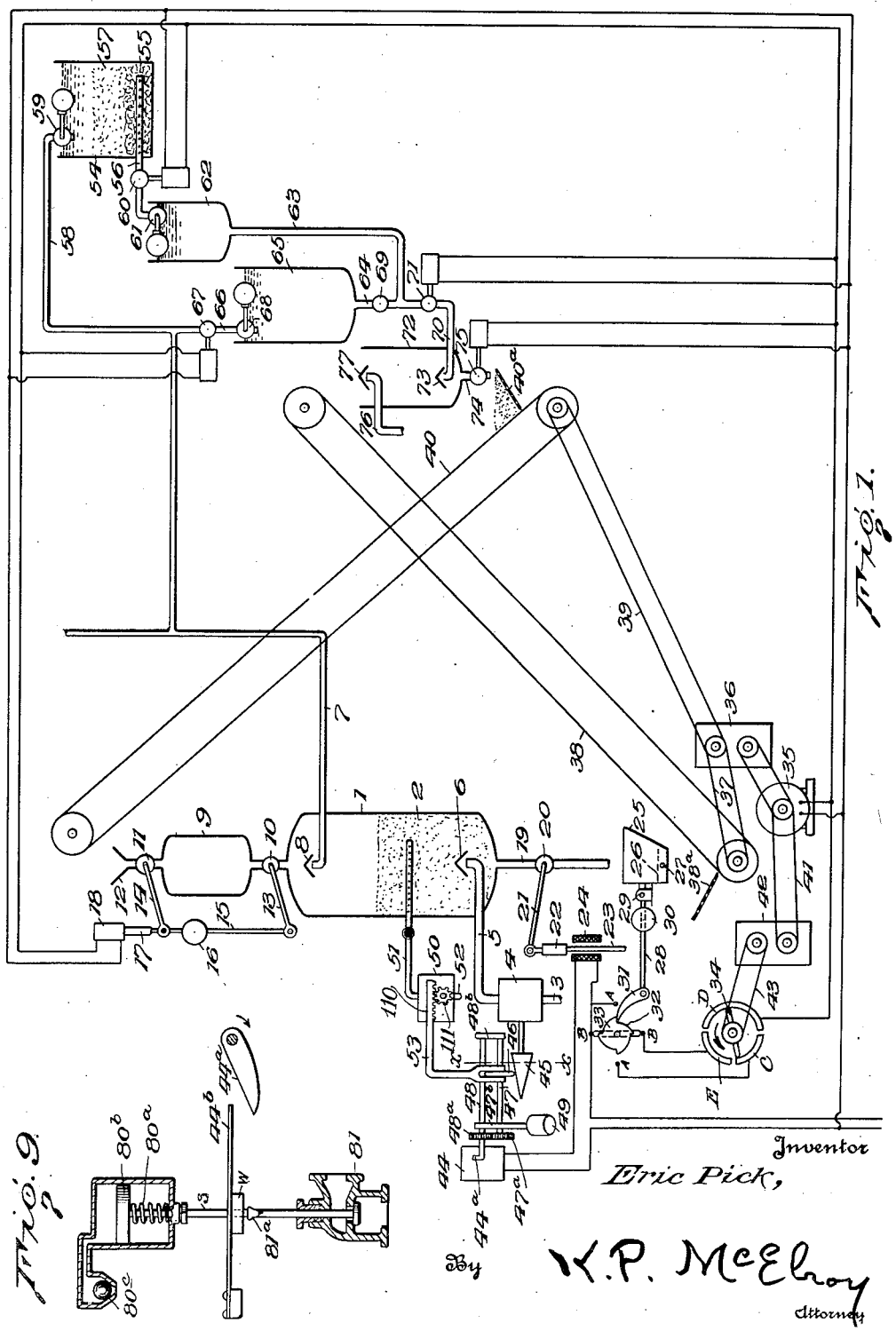
Fig. 1 is a diagrammatic sectional view of an electrically controlled water softening apparatus.
Fig. 2 is a similar view of a hydraulically controlled apparatus.

Referring first to Fig. 1, a water softening chamber 1 contains a body of granular base exchange zeolite 2 and the hard water supply runs into chamber 1 near its bottom from supply pipe 3 through water meter 4 and pipe 5 which is provided with a hood 6 to prevent plugging of pipe 5 with zeolite. Softened water runs out from near the top of chamber 1 through soft water service pipe 7 provided with hood 8, chamber 1 being maintained under the pressure of the water supply. Zeolite is introduced into the top of chamber 1 by means of locking compartment 9 connected through valve 10 and having an inlet valve 11 and zeolite hopper 12. Valve 10 is held normally open and valve 11 normally closed, their respective operating levers 13 and 14 being connected by link 15 which carries a weight 16 serving to keep the valve 10 normally open and valve 11 normally closed. Link 15 has on its upper end an iron core 17 which is raised by a solenoid 18 when the current is turned on and which thus serves to close valve 10 and to open valve 11.

Running from the bottom of chamber 1 is zeolite outlet pipe 19 fitted with valve 20 having operating lever 21 turnably connected to an iron core 22 movable by solenoid 24 and having an extension 23. Valve 20 is normally closed and is opened when solenoid 24 is energized. Below outlet pipe 19 is placed bucket 25 having a screened false bottom 26 and a side liquid outlet 27 below the false bottom. Bucket 25 is supported on rod 28 pivoted at 29, the bucket being counterweighted by a weight 30 slidable on rod 28. Rod 28 carries at its opposite end a pawl 31 which meshes with a ratchet wheel 32 operating a two-way electrical switch 33 having terminals A—A and B—B. Switch 33 is electrically connected in series with another two-way switch 34 having terminals C, D and E and being in the circuit of an electro-motor 35. The shaft of motor 35 is connected to a speed reducer 36 adapted to operate by means of a belt 37 a zeolite conveying belt 38 placed to receive zeolite from bucket 25. The speed reducer 36 is also adapted to operate by means of belt 39 another conveying belt 40. The two zeolite conveying belts are provided with perforated guards or buckets 38a and 40a. The shaft of motor 35 is also connected by a belt or chain 41 to a reducing train 42 adapted to shift by means of chain 43 the terminal connections of switch 34 after operation of motor 35 for a predetermined time.

Solenoid 24 is energized by an electric circuit closed by means of water meter 4 which is arranged to operate a momentary contact switch 44 in the solenoid circuit. The connection between the meter 4 and switch 44 comprises a conical wheel 45 geared, by gear means not shown, to the shaft of the meter, friction wheel 46 engaging with conical wheel 45 and slidably but not turnably attached to shaft 47, which is turnably mounted by means of brackets 47b and 48b on a counter-shaft 48 geared to shaft 47 by gears 47a and 48a, counter-shaft 48 carrying a lever 44a. Bracket 47b has an extension to which is attached weight 49 holding friction wheel 46 against conical wheel 45. Momentary contact switch 44 (Figs. 3, 4, 5) comprises an electrically conducting spring 44b, contact points 44c, attached to the spring, and 44d attached to the switch casing, the spring 44b and the contact point 44a being connected in the electric circuit. Spring 44b is clamped between two insulating lugs 44e. In operation, the lever 44a which is made of non-conductive material such as hard rubber, bends the spring away from the stationary contact point 44d (Fig. 4) until the point of the lever clears the end of the spring. This releases the spring which snaps back and causes a momentary contact between points 44c and 44d (Fig. 5) closing the circuit momentarily, whereupon the spring returns to its normal position as shown in Fig. 3. Upon completion of a revolution of counter-shaft 48, lever 44a snaps the spring 44b and the time required for one complete revolution of shaft 48 is determined by the flow of water through meter 4 and also depends upon the position of wheel 46 on conical wheel 45. This position may be adjusted automatically by means of hardness tester 50 which is adapted to receive a constant trickle of water through perforated tube 51 from the water softening chamber 1 at a sampling level well below the top of the body of zeolite 2, a waste pipe 52 being provided. Hardness tester 50 is adapted to cause a lateral movement of fork 53 upon occurrence or change of hardness in the tested water and thereby to shift the position of wheel 46, the motion of shafts 47 and 48 being thus compounded of the motion of water wheel 4 and that of the hardness tester. For purposes of indication and control responsive to hardness in the water sampled through tube 51, a suitable mechanism is of a kind such as those described in U. S. Patent 1,643,243 and in U. S. Patent 1,903,957. A suitable hardness tester control mechanism which comprises a conductivity cell, a movable contact member, a relay circuit and an electromotor and which is readily adaptable to cause a shifting of fork 53 and thus of wheel 46 in response to variations of hardness in the water sampled through tube 51 is provided in the type of control mechanism described in U. S. Patent 1,759,996 to Parker. In this mechanism the motor valve control responds to decrease and increase in conductivity of the water due respectively to increase and decrease of its hardness.

The Parker valve operating motor is adapted to turn the valve stem one way upon increase in conductivity, the other way upon decrease, the amount of turning depending on the degree of conductivity. In using this device in my apparatus, for the valve stem 54 in the Parker device I substitute a pinion, and provide fork arm 53 with a rack engaging the pinion. As shown in Fig. 1, pinion 111 is carried upon the Parker valve operating device contained in box 50, the pinion of the Parker valve-actuating motor N engaging rack 110 on fork arm 53. An increase in conductivity (corresponding to a decrease in hardness) causes pinion 111 to turn counter-clockwise, shifting the fork arm 53 and the wheel 46 to the left and lengthening the intervals between closure of the control switch 44. A decrease in conductivity due to an increase of hardness has just the opposite effect.

It will be seen that the transmission comprising cone 45, wheel 46 and shaft 47, arm and fork 53, and the gears 47a and 48a, is in effect a measurement compounding device in which the indication of the hardness tester as reflected in the lateral position of member 53 is made to modify the movement of the rotating water meter shaft, the rotation of lever 44a being controlled both by the rotation of the water meter shaft and by the indication of the hardness tester. The transmission, as shown, mechanically connects the hardness tester, the meter, and the rotary switch lever 44a, allowing the translatory motion of the hardness testing device to modify the rotary motion of the water meter. The indications of the hardness tester and of the water meter, each indication being reflected in a mechanical movement, are compounded to produce a single joint effect: controlled rotation of shaft 47. In the modification shown in Fig. 1 one joint-motion shaft 47 is coupled or connected to the shaft 48 carrying the switch lever 44a, by means of gears 47a and 48a. In the modification shown in Fig. 2 a joint-motion shaft 85 carries the lever 44a directly. It has a direct actuating connection with the snap action valve operating mechanism.

I have shown a system for regenerating zeolite taken out of chamber 1. In this system a salt tank 54 contains a layer of gravel 55 in which a perforated discharge pipe 56 is embedded, an overlying layer of salt being shown at 57. A branch pipe 58 runs from the soft water service pipe 7 (or from the hard water line 3) into the top of salt tank 54, and in pipe 58 near its end in the tank a float valve 59 is placed. In the discharge pipe 56 is placed a normally open solenoid spring valve 60, closable by electric current, the discharge pipe delivering through a float valve 61 in a brine measuring tank 62. From the bottom of this tank a brine discharge pipe 63 connects with discharge pipe 64 running from the bottom of a rinse water measuring tank 65, the top of the rinse water tank being at a level below the bottom of brine tank 62. Rinse water is supplied through pipe 66, branching off from pipe 58. In pipe 66 is a normally open solenoid spring valve 67 which closes upon the application of electric current. There is on pipe 66 in tank 65 a float valve 68. Rinse water discharge pipe 64 is provided with a check valve 69 preventing flow of brine from tank 62 into tank 65. Pipes 63 and 64 are connected through a T into pipe 70 which is provided with a normally closed solenoid spring valve 71 adapted to be opened when energized by electric current. Pipe 70 discharges into a treatment tank 72 near its bottom, the opening of the pipe being protected by a hood 73. Treatment tank 72 is on a level below rinse water tank 65. It has a zeolite outlet pipe 74 connected to its bottom and provided with a normally open spring solenoid valve 75 adapted to be closed by electric current. Tank 72 also has near its top a waste discharge pipe 76 protected by a hood 77.

Fig. 1 shows the apparatus in the normal position when a portion of zeolite has just been regenerated. In operation, meter 4 and wheel 46 are arranged to make a momentary contact in switch 44 each time a predetermined quantity of water of a known degree of hardness shall have passed through the meter, that is, after a predetermined amount of hardness has been taken up by the zeolite momentary contact switch 44 automatically closes and immediately opens again. The momentary closing of the electrical circuit energizes the solenoid 24, whereupon core 22 is pulled down and valve 20 is opened. A mixture of zeolite and water then flows from the bottom of chamber 1 into the bucket 25, the water passing through the screen bottom 26 and out of the bucket through outlet 27 to waste. The counterweight 30 is of such a weight and its position on rod 28 is so adjusted that when a predetermined amount of zeolite has run into bucket 25, the bucket tips and discharges the zeolite onto the conveyor 38. The tipping of the bucket causes the rod 28 to push against the projection 23 on the iron core 22 and thereby to close the valve 20. The adjustment by means of counterweight 30 of the quantity of zeolite required to tip bucket 25 should be such that the amount of calcium and magnesium or other hardening constituents taken up by the portion of the zeolite in the bucket corresponds to the amount of these constituents in the water passing through the meter and causing the energizing of solenoid 24 which opens valve 20 and starts the zeolite transfer.

By the tipping of the bucket 25 pawl 31 turns the ratchet wheel 32 changing the electrical connections of switch 33 from the terminals B—B to the terminals A—A, or vice versa. This places the switches 33 and 34 in electrical connection, closes the circuit of motor 35 and also supplies current to solenoid 18 and to the solenoid valves 60, 67, 71 and 75. The energizing of the valve solenoids closes valves 60, 67, and 75 and opens valve 71. Thereupon the zeolite which has been discharged from the bucket 25 onto conveyor 38 is conveyed to the treatment tank 72 and at the same time a portion of zeolite previously treated and lying on the conveyor 40 is transported to the funnel 12 and, valve 11 having been opened and valve 10 closed by the energizing of solenoid 18, the zeolite portion drops from funnel 12 into compartment 9. The opening of valve 71 causes the brine in the brine measuring tank 62 to flow into the treatment tank 72 to regenerate the zeolite dropping from the conveyor 38 into tank 72 and, when tank 62 is emptied of brine, rinse water flows from the rinse water measuring tank 65 into tank 72 and rinses the zeolite portion therein. The used brine and rinse water are discharged to waste through pipe 76.

After a predetermined period of time, which is adjusted according to requirements, the switch 34 is turned by the motor to change the connection from terminals C—D to the terminals E—D (or vice versa), thereby opening the electric circuit, causing the motor to stop and deenergizing the solenoid 18 and the solenoids of valves 60, 67, 71 and 75. Upon the deenergizing of solenoid 18 the weight 16 closes valve 11 and opens valve 10 so that the previously regenerated portion of zeolite drops from compartment 9 into water softening chamber 1. The cutting off of the current opens solenoid valve 75 and the freshly regenerated and washed zeolite contained in tank 72 together with the last portion of rinse water is discharged onto the perforated guard of bucket 40a which retains the zeolite and permits the water to pass to waste. By the opening of the electric circuit, valve 71 is closed and valves 60 and 67 are opened, which causes the brine in measuring tank 62 to be filled with brine up to a level controlled by the setting of float valve 61, and also causes the rinse water measuring tank 65 to be filled with water up to a level controlled by the float valve 68. Float valves 61 and 68 are set to admit to tanks 62 and 65 the proper amounts of brine and wash water respectively required to regenerate, rinse and cleanse the transferred portions of zeolite. The salt tank 54 is at all times kept filled with water by the automatic action of float valve 59 and salt is supplied to tank 54 as required.

The apparatus is now ready to repeat the portional zeolite transfer, regeneration and washing as soon as the momentary contact switch 44 is closed again.

In the apparatus combination illustrated in Fig. 2, the operation is by hydraulic instead of electrical means. Figs. 7 and 8 illustrate a suitable valve construction. Solenoid 18 is replaced by a piston arrangement 18a by means of which valve levers 13 and 14 are raised by fluid pressure and lowered as before by weight 16 when the fluid pressure is turned off. Electrical switch 44 is replaced by a momentary valve operating mechanism 80 connected with valve 81. The valve operating mechanism 80 may be constructed as shown in Fig. 9. The spring 44b carries a weight w which upon actuation of the spring by lever 44a strikes projection 81a on the spindle s of valve 81, thereby opening the valve. The valve is thereafter slowly restored to the closed position by means of a spring 80a modified in action by means of a dash-pot piston-cylinder arrangement 80b and ball valve 80c. In the hydraulic system illustrated, pipe 3a in which valve 81 is located is connected to the hard water supply line. The opening of valve 81 admits water to fill the bucket 24a connected to lever 21 of valve 20. When the bucket 24a is filled with water its weight pulls down lever 21 thereby opening valve 20 and starting the discharge of a zeolite portion from chamber 1. As soon as bucket 24a is filled with water a siphon 24b on the bucket becomes operative and promptly empties bucket 24a to waste. Valve 20 is closed in a manner similar to that described for the apparatus of Fig. 1, namely, by the tipping of bucket 25 causing rod 28 to push upward projection 23 of bucket 24a, thereby raising lever 21. Upon being tipped bucket 25 dumps its contents into a sump 78.

Fig. 2 shows an alternative means of transmitting the rotation of water meter 4 to a shaft lever 44a to actuate the spring of the valve operating mechanism 80. In this alternative means turn table 82 is geared by bevel gears 83 to the shaft of the meter 4 and friction wheel 84, slidably mounted on shaft 85, rides on table 82. Shaft 85 carries the lever 44a which actuates the spring of valve operating mechanism 80. Adaptation of the time of opening the valve to varying degrees of hardness in the water is accomplished by a radial shifting of wheel 84, on the turn table 82. This means of adaptation can be substituted in the mechanism of Fig. 1.

In the hydraulic system shown in Fig. 2 the switches 33 and 34 of Fig. 1 are replaced by valves 87 and 88 operating in series. Pawl 31 and ratchet wheel 32 are adapted to turn a channel 86 in a multi-port valve 87 alternately to one connection 87a—87b and to another connection 87c—87d. Each change of position of channel 86 causes water to flow from pipe 3a through valve 87, thence through another valve 88, to injectors 89 and 90, respectively transferring zeolite portions from sump 78 to treatment tank 72 and from a sump 79 below the treatment tank to hopper 12, the hopper being provided with a hooded waste pipe 12b. Valve 88 comprises a channel 88b and casing ports and connections 88c, 88d, and 88e. The connections between valves 88 and 87 are adapted to place the two valves in series. The tilting of bucket 25 places the multi-port valves 87 and 88 in position to admit a supply of water under pressure to injectors 89 and 90 and likewise to apply hydraulic pressure to the diaphragm valves 60a, 67a, 71a and 75a, and to the cylinder 18a. The suction connection of injector 89 is connected to the sump 78 so that the flow of water through injector 89 transports the zeolite and water contained in sump 78 to the treatment tank 72, whence the water is discharged to waste through the pipe 76.

Fig. 7 illustrates a suitable construction of a normally open hydraulically closable valve and Fig. 8 illustrates a normally closed valve adapted to be opened by hydraulic pressure. A diaphragm b is held between the valve casing a and the cover c which form a pressure-tight compartment e, pressure for operating the valve being applied through pipe p. The spindle f is pressed against the diaphragm by spring d so that the member g is normally held away from port h as in Fig. 7 and against port h as in Fig. 8, application of pressure in compartment e closing and opening the valve respectively against the tension of the spring.

It will be understood that the operation of the hydraulic apparatus depicted in Fig. 2 is similar to that of the apparatus of Fig. 1. Passage of a predetermined amount of water through meter 4 actuates the spring of the valve opening mechanism 80 to open valve 81 and thereby to fill bucket 24a, opening valve 20 and filling bucket 25 until it dumps its content of zeolite into sump 78, the water being also discharged into sump 78 through the screen bottom 26. Thereupon water is admitted through valves 87 and 88 to injectors 89 and 90 and pressure is applied to the diaphragm valves. At the same time valve 10 is closed and valve 11 opened by admission of pressure to cylinder 18a. Stopping of the hydraulically operated mechanism is effected by means of cable 92 which is attached to a float 93 in the rinse water measuring tank 65. This cable runs over the pulleys 94, 95, 96 and 97 to the lever 98, pivoted at 99, and carrying at its end a pawl 100. Lowering of the water level in tank 65 causes the pawl 100 to turn the ratchet wheel 101 until the channel 86 connects two of the port connections 88c, 88d and 88e, in such a manner as to cut off the flow of water through valves 88 and 87, thereby shutting off the water supply to the injectors 89 and 90 and restoring the diaphragm valves 60a, 67a, 71a and 75a as well as valves 10 and 11 to their normal positions, the water pressure on the diaphragm valves and the cylinder 18a being dissipated to atmosphere through the injectors 89 and 90. A subsequent turn of ratchet wheel 32 of valve 87 by pawl 31 again places the two valves in a position admitting water to the hydraulic system.

The placing of the sampling pipe 51 below the top of the zeolite body in chamber 1 has the advantage of allowing a reserve of zeolite above the sampling pipe. With a small degree of hardness in the water running out through pipe 51 the water passing from the extreme top of the zeolite bed may be completely soft. However it is possible to operate with the sampling pipe connected to the hard water supply pipe either before or behind the meter 4, and to have wheel 46 (or wheel 84) moved in response to variations in the total amount of hardness in the raw water. In this way the timing of the proportional zeolite transfers with regeneration may be made somewhat more directly responsive to the amount of softening performed by the zeolite, that is, to the product of degree of hardness times quantity of the water passing through the meter. It will be understood that, if desired, the meter may be placed on the soft water service line instead of on the hard water supply line. If desired, the adjustment of wheel 46 or of wheel 84 to meet changes in the hardness of the water being softened can be accomplished by manually operated means.

An alternative method of automatic control and coordination of zeolite regeneration corresponding to its exhaustion is illustrated in Fig. 10. In this method the water sampled through tube 51 is mixed in a definite ratio with soap in solution introduced through pipe 51a and in the hardness tester (50) the mixture is agitated by a blast of air introduced through pipe 51c, whereupon, as long as the sampled water remains soft the resulting froth of soap bubbles holds up a float F which is connected to wheel 84 by a bell crank lever C and fork 53; wheel 84 being thereby held at the center of turn table 82 and being shifted toward the periphery of table 82 when a small amount of hardness appears in the sampled water and the froth of soap bubbles subsides, causing the float F in dropping to push wheel 84 away from the center of the turn table; this shift of wheel 84 resulting in rotation of shaft 85 and thus in a snapping of spring 44b by lever 44a to start transfer of zeolite for regeneration as hereinbefore described. In this method of control, the water meter may be dispensed with and table 82 may be continuously rotated by an electromotor connected to gears 83; a replacement of exhausted zeolite with regenerated zeolite being effected whenever hardness appears in the water at a chosen level below the top of the zeolite body; this level being so chosen that hardness appears here when the lower layer of the zeolite body is nearly exhausted and the layer of zeolite above the sampling level has as yet taken up but little if any of the hardness giving elements. In carrying out this method of control in electrical operation of the type shown in Fig. 1, the soap bubble switching arrangement of U. S. Patent 1,903,957 mentioned supra may be used. This method effects somewhat indirectly a coordination of regeneration with the product of the amount of water softened multiplied by its degree of original hardness.

The hardness tester 50 as described in U. S. Patent 1,759,996 is made to shift the fork 53 in proportion to the hardness of the water being tested so that the movement of wheels 46 or 84 respectively is in proportion to the product of the quantity of water times its hardness. With the sampling pipe 51 taking in hard water from the supply pipe 3 or 5, regeneration is initiated every time a predetermined quantity of hardness has been passed into the softening chamber 1. In the alternate arrangement shown in Fig. 10 the water sample is taken through the pipe 51 embedded in the body of zeolite. So long as this water sample is soft the float F is maintained in an elevated position by the foam, and wheel 84 is located in the center of wheel 82 so that there is no movement of shaft 85. This is the position shown in the drawings. When the water coming through sampling pipe 51 is hard the foam disappears, the float F drops, thereby pushing wheel 84 towards the circumference of the wheel 82, and the wheel 84 begins to rotate due to the fact that wheel 82 is rotated through the bevel gears 83 by the water meter 4 or any other suitable type of motor. With this arrangement regeneration is initiated whenever the zeolite below the level of pipe 51 has been exhausted in its softening capacity.

In some cases it is desirable to transfer zeolites continuously for regeneration. As a means of bringing about a substantially continuous movement of zeolite from a softening chamber to another chamber for regeneration and a substantially continuous return of regenerated zeolite to the softening chamber, the apparatus of the Nordell Patent No. 1,740,199 may be used. In such an apparatus the rate of zeolite movement can be coordinated with the rate of water softening by means of a flow meter in the raw water line ($a_1$), or in the soft water service pipe ($a_6$), the meter being connected to control the degree of opening of the waste water outlet valve ($h_{13}$), this valve controlling the rate of zeolite transfer. Another method of coordination in the apparatus of the Nordell patent is the insertion in the waste water line ($f^2$) of a normally closed valve adapted to be opened by the water meter at intervals determined by the quantity of water softened and its degree of original hardness; the valve being closable by a timing device of known construction adapted to close the valve after it has been open for a predetermined interval of time sufficient to regenerate an amount of zeolite capable of absorbing hardness corresponding in amount to that originally in the water actuating the meter and causing the opening of the waste water valve.

Where it is desired to soften water continuously and at a substantially constant rate of flow a time clock can be used to govern the duration of the time intervals between the portional zeolite transfers. Knowing the amount of soft water required and the degree of hardness in the raw water to be softened, it is a simple matter to determine the amount of zeolite required to be regenerated in a given time in order to maintain the softening power of the body of zeolite in chamber 1. The time clock may be then arranged to close the momentary switch 44 and thus to energize solenoid 24 at predetermined intervals of time and the setting of the time clock and thus the time intervals between successive regenerations can be varied to meet varying degrees of hardness in the water being softened or changes in rate of flow.

It is to be noted that in the above described operations, the portion of zeolite transferred for regeneration may be completely exhausted while the remainder retains adequate exchange power to insure complete softening of the water passing through the softener at all times. The invention provides exact and positive control of the quantities of zeolite, brine and wash water involved in the functions of softening, regenerating and cleansing.

What I claim is:—

1. A base exchange water softening apparatus comprising means for transferring portions of the base exchange material from a water softening chamber for regeneration elsewhere, means measuring the quantity of said portions of base exchange material transferred, and means for initiating said portional transfers actuated by flow of the water passing through the water softening chamber.

2. In regenerative base exchange water softening apparatus having means for removing base exchange material from a softening chamber for regeneration elsewhere, a water meter measuring the flow of water being softened, means actuated by the water meter for starting said removing means and means for stopping said removing means, said stopping means being adapted to be governed by a predetermined quantity of the material removed.

3. In base exchange water softening, a method which comprises transferring base exchange material from a water softening chamber for regeneration elsewhere, metering the water being softened in said chamber and testing its hardness, controlling the quantity of the transferred base exchange material by the measured amount of water passing through the chamber, adjusting the said control by variations in the degree of hardness in the water and returning to said chamber the transferred material after its regeneration.

4. A method of continuous base exchange water softening which comprises circulating the base exchange material through a softening phase, a regenerating phase and back to the softening phase, measuring the flow of water being softened and the hardness of the water, determining from the measurements of flow and hardness the rate at which the base exchange material is being exhausted, and regulating the rate of circulation by the thus measured rate of exhaustion of the base exchange material in the softening phase.

5. A method of continuous base exchange water softening which comprises transferring the base exchange material from a softening chamber for regeneration elsewhere, returning the transferred material after regeneration to the softening chamber and controlling the quantity of the transferred material both by the amount of water softened and by the degree of hardness removed from the water.

6. In softening water by percolation thereof through a body of zeolites, the process which comprises removing definite portions of the body from time to time for regeneration, returning to the body regenerated removed portions thereof, measuring the quantity and hardness of water being softened and timing the intervals between said portional removals in inverse proportion to the actual amount of base exchange water softening taking place in the zeolite body as indicated by said quantity and hardness measurements.

7. In a zeolite water softener, a zeolite container with water inlet and outlet, a separate regenerating chamber, means for removing zeolites from the container, means for conveying said zeolites to the regenerating chamber, means for removing zeolites from the regenerating chamber, means for returning regenerated zeolites to the zeolite container, a water meter operated by the flow of water through the zeolite container and adapted to start operation of the means for removal of zeolite from the container, means associated with said zeolite removing means for stopping said removal and means actuated by said stopping means for starting the zeolite conveying and returning means.

8. In a zeolite water softening system having a softening chamber with means for passing water through a body of zeolites therein and a separate chamber for zeolite regeneration and means for transferring zeolites from each chamber to the other, the improvement which comprises a water meter actuated by the flow of water being softened and means connecting the meter to the zeolite transfer means so that the zeolite transfer is automatically controlled at a rate proportional to the flow of water being softened.

9. In a base exchange water softening system comprising a container adapted to contain a bed of zeolites, a bed of zeolites therein, conduits for passing water to and from the container, a supply of brine, means for regenerating the zeolites by bringing them in contact with brine, a water meter in one of the water conduits and adapted to be actuated by the flow of water, said system being provided with means adapted to be controlled by the water meter for starting said regenerating means, means for automatically adjusting the water meter control to meet variations in the hardness of the water being softened which comprises a hardness tester receiving water from the softener and an operative connection between the hardness tester and the water meter control means, said operative connection being adapted to be actuated by hardness present in the water received by the hardness tester.

10. A regenerative base exchange water softener comprising a container adapted to hold a body of zeolites, an inlet connection for said container admitting raw water, an outlet connection for softened water, means for regenerating the body of zeolites, and means for starting said regenerating means, a water meter in one of said water connections adapted to produce a mechanical movement in proportion to the flow of water, a hardness tester adapted to test the hardness of water in the container and to produce a mechanical movement according to the varying hardness of the water, means adapted to compound the two said movements into a third mechanical movement, and an operative power-transmitting actuating connection between the movement-compounding means and said starting means.

11. In base exchange water softening the method of coordinating regeneration of the base exchange material with its exhaustion which comprises flowing the water through a body of base exchange material to service, sampling and testing the water for hardness after its flow through a portion only of said body, removing definite portions of said body for regeneration upon occurrence of hardness in said tested water, regenerating the portions elsewhere in a separate zone, and returning the regenerated portions of material to said body.

12. A base exchange water softening apparatus comprising a water softening chamber containing a body of base exchange material, means for periodic transfer of portions of said body from said chamber for regeneration elsewhere and return to the softening chamber and means actuated by the flow of water being softened and controlled by the quantity of said flow for initiating the portional transfers.

13. In a continuously operable regenerative base exchange water softening system, a method which comprises coordinating regeneration of the base exchange material with its exhaustion by withdrawing from one end of the body of the material at controlled time intervals regulated portions of substantially fully exhausted material while leaving unexhausted material at the other end of said body and by regenerating and returning said portions to said other end of the body at the same controlled intervals, said time intervals being inversely proportional to the product of quantity and hardness of the water softened.

14. A water softening apparatus comprising a body of zeolite, means for flowing water to be softened through said body, means for regenerating the zeolite by bringing it in contact with salt solution, means for starting said regenerating means, means for washing out the salt solution, means for testing the hardness of water, and a sampling pipe connected at one end to the hardness testing means and having its other end embedded in the body of zeolite a substantial distance from the surface of the body at rest, said hardness testing means being thereby adapted to detect when hardness appears at a predetermined point part way along the length of the bed and being adapted to actuate the starting means.

15. In a water softening apparatus comprising a container adapted to hold a bed of zeolites, a source of brine, a plurality of conduits adapted to conduct flows of water to and from the container, and means for regenerating, the improvement which comprises means adapted to control the regeneration according to the actual amount of hardness removed by the zeolite bed regardless of variations in degree of hardness of the water and in rate of hard water flow, said control means comprising hardness testing and indicating means, a water meter measuring and indicating the flow of water through the apparatus, means for compounding the indications of hardness and of flow, means for starting regeneration, and an actuating connection between said compounding means and said starting means.

ERIC PICK.